(12) United States Patent
Huang et al.

(10) Patent No.: US 12,183,957 B2
(45) Date of Patent: Dec. 31, 2024

(54) ASSEMBLED STRUCTURE OF POLE AND POLE CURRENT COLLECTOR DISK, AND BATTERY

(71) Applicant: EVE POWER CO., LTD., Hubei (CN)

(72) Inventors: Liming Huang, Hubei (CN); Liangliang Yue, Hubei (CN); Jing Liu, Hubei (CN); Yuebin Xu, Hubei (CN); Wei He, Hubei (CN)

(73) Assignee: EVE POWER CO., LTD. (CN)

( * ) Notice: Subject to any disclaimer, the term of this patent is extended or adjusted under 35 U.S.C. 154(b) by 0 days.

(21) Appl. No.: 18/013,934

(22) PCT Filed: May 18, 2022

(86) PCT No.: PCT/CN2022/093476
§ 371 (c)(1),
(2) Date: Dec. 30, 2022

(87) PCT Pub. No.: WO2022/242666
PCT Pub. Date: Nov. 24, 2022

(65) Prior Publication Data
US 2024/0243452 A1 Jul. 18, 2024

(30) Foreign Application Priority Data
May 21, 2021 (CN) .......................... 202121102907.0

(51) Int. Cl.
*H01M 50/593* (2021.01)
*H01M 50/536* (2021.01)
*H01M 50/559* (2021.01)

(52) U.S. Cl.
CPC ....... *H01M 50/593* (2021.01); *H01M 50/536* (2021.01); *H01M 50/559* (2021.01)

(58) Field of Classification Search
CPC . H01M 50/593; H01M 50/559; H01M 50/536
See application file for complete search history.

(56) References Cited

U.S. PATENT DOCUMENTS 11,699,825 B2 * 7/2023 Wakimoto .......... H01M 50/183
429/185
2003/0124420 A1 7/2003 Fong
(Continued)

FOREIGN PATENT DOCUMENTS

CN 103151475 6/2013
CN 204230367 3/2015
(Continued)

OTHER PUBLICATIONS

Patent Cooperation Treaty (PCT), International Search Report and Written Opinion for Application PCT/CN2022/093476 filed May 18, 2022, mailed Jul. 5, 2022, International Searching Authority, CN.
(Continued)

*Primary Examiner* — Jane J Rhee
(74) *Attorney, Agent, or Firm* — McDonald Hopkins LLC

(57) ABSTRACT

Provided are an assembled structure of a pole and a pole current collector disk. The assembled structure includes a positive pole, a positive current collector disk, a first insulating member and a second insulating member, where the second insulating member is disposed between the positive current collector disk and the first insulating member. The positive pole includes a conductive end and a connection end, the conductive end and the connection end are connected through the connection rod. The connection rod sequentially penetrates through the first insulating member and the second insulating member, the first insulating member is closer to the conductive end than the second insulating member, and an accommodating space is formed between the first insulating member and the second insulating member. The positive current collector disk includes a welding disk and a conductive protrusion.

20 Claims, 4 Drawing Sheets

(56) References Cited

U.S. PATENT DOCUMENTS

2011/0300419 A1    12/2011  Byun
2018/0358648 A1*  12/2018  Guen .................... H01M 4/662

FOREIGN PATENT DOCUMENTS

| CN | 208862041 | 5/2019 |
| --- | --- | --- |
| CN | 209071393 | 7/2019 |
| CN | 112821015 | 4/2021 |
| CN | 113346168 | 9/2021 |
| CN | 113346201 | 9/2021 |
| CN | 215578674 | 1/2022 |
| CN | 215578675 | 1/2022 |
| JP | 2016039016 A | 3/2016 |
| JP | 2019145491 A | 8/2019 |
| WO | 2021068436 | 4/2021 |
| WO | 2023213066 | 9/2023 |

OTHER PUBLICATIONS

Patent Cooperation Treaty (PCT), Written Opinion for Application PCT/CN2022/093476 filed May 18, 2022, mailed Jul. 5, 2022, International Searching Authority, CN.
Office Action drafted Jan. 17, 2024; Japanese Patent Application No. 2023-541827.
Extended European Search Report for Application 22803986.3, PCT/CN2022/093476, dated Apr. 9, 2024, 40 pgs., European Patent Office, Germany.

* cited by examiner

ASSEMBLED STRUCTURE OF POLE AND POLE CURRENT COLLECTOR DISK, AND BATTERY

CROSS-REFERENCE TO RELATED APPLICATIONS

This application is a U.S. National Stage Application filed under 35 U.S.C. 371 of International Patent Application No. PCT/CN2022/093476 filed on May 18, 2022 which claims priority of Chinese Patent Application No. 202121102907.0, filed with the Chinese Intellectual Property Administration (CNIPA) on May 21, 2021 the disclosures of which are incorporated herein by reference in their entireties.

TECHNICAL FIELD

The present application relates to the field of batteries, and for example, to an assembled structure of a pole and a pole current collector disk and a battery provided with the assembled structure described above.

BACKGROUND

A battery generally includes a housing and a cover board, a cell is disposed inside the housing with a groove body structure, a groove opening of the housing is connected to the cover board in a sealed manner, and an electrode of the cell is connected to an end surface, located within the housing, of the cover board by a tab, so that the cover board is used as one pole of the battery to be connected to an external apparatus.

A difference between a cylindrical full-tab lithium ion battery and a cylindrical lithium ion battery is in that: the cylindrical full-tab lithium ion battery is provided with a positive pole but not provided with the cover board, a housing of the cylindrical full-tab lithium ion battery is of the groove body structure, and the groove opening of the housing is connected to a negative pole cover board, an end of the positive pole penetrates through a groove bottom surface of the housing from an end surface, facing away the groove opening, of the housing and enters the housing; and an end, located within the housing, of the positive pole is connected to a positive plate of the cell by a positive current collector disk. Therefore, an assembled structure of the cell and a positive pole tab in the cylindrical lithium ion battery is not suitable for the cylindrical full-tab lithium ion battery.

SUMMARY

The present application provides an assembled structure of a pole and a pole current collector disk suitable for a cylindrical full-tab lithium ion battery and a battery provided with the assembled structure described above.

The present application provides an assembled structure of a pole and a pole current collector disk. The assembled structure includes a positive pole, a positive current collector disk, a first insulating member and a second insulating member. The second insulating member is disposed between the positive current collector disk and the first insulating member. The positive pole includes a conductive end, a connection end and a connection rod, the conductive end and the connection end are connected through the connection rod, and a width of the conductive end and a width of the connection end are both larger than a width of the connection rod. The connection rod sequentially penetrates through the first insulating member and the second insulating member, the first insulating member is closer to the conductive end than the second insulating member, and an accommodating space is formed between the first insulating member and the second insulating member. The positive current collector disk includes a welding disk and a conductive protrusion, the conductive protrusion is disposed on an end surface of the welding disk facing the second insulating member, and an end surface of the connection end facing the positive current collector disk is provided with a first groove, a contact portion of the positive current collector disk and the positive pole is only an end surface of the conductive protrusion facing away the welding disk and a groove bottom surface of the first groove.

The present application further provides a battery. The battery includes a housing and a cell disposed inside the housing, the battery is provided with the assembled structure of the pole and the pole current collector disk described above. The housing is of a groove structure, and the housing includes a housing bottom portion and a housing bottom end surface.

Figure 1:
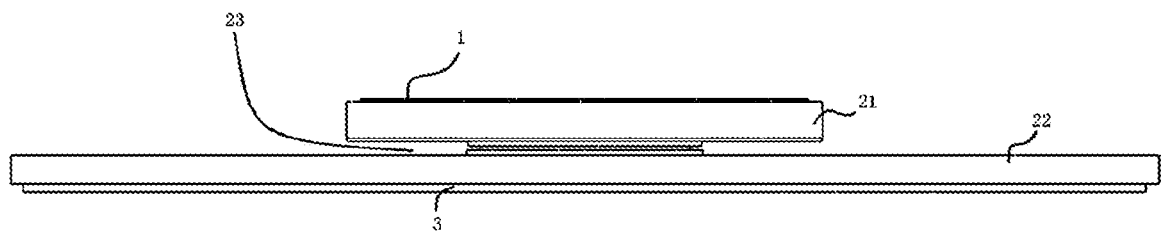
FIG. 1 is a front view of an assembled structure of a pole and a pole current collector disk provided in an embodiment of the present application.

1, Positive pole; 11. Conductive end; 12. Connection end; 121. First groove; 13. Connection rod; 21. First insulating member; 211. Second groove; 212. First through hole; 22. Second insulating member; 221. Third groove; 222. Second through hole; 23. Accommodating space; 3. Positive current collector disk; 31. Welding disk; 32. Conductive protrusion; 4. Housing; 41. Connection hole; 42. Housing bottom portion; 43. Housing bottom end surface; 5. Cell.

DETAILED DESCRIPTION

The specific embodiments described herein are merely illustrative of the present application.

In the description of the present application, an orientation or a positional relationship indicated by the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", and the like is based on an orientation or a positional relationship shown in the drawings, and is only for the purpose of facilitating the description of the present application and simplifying the description, and is not intended to indicate or imply that the device or element in question must have a particular orientation, be constructed and operated in a particular orientation, and thus cannot be understood as a limitation of the present application. Furthermore, the terms "first" and "second" are used for descriptive purposes only and are not to be understood as indicating or implying relative importance or as implicitly indicating a number of technical features indicated. Thus, features defined as "first" or "second" may explicitly or implicitly include one or more of the described features. In the description of the present application, "multiple" means two or more, unless otherwise defined.

In the description of the present application, unless specified and limited otherwise, the terms "mounted," "interconnected," and "connected" are to be understood broadly and, for example, may be fixedly connected, may be detachably connected, or may be integrally connected; may be mechanically connected, may be directly connected, may be indirectly connected through an intermediate medium, may be internally communicated with each other or may be interactively connected to each other. The meaning of the above terms in the present application may be understood by those of ordinary skill in the art according to circumstances.

In the present application, unless specified and limited otherwise, a first feature being "on" or "under" a second feature may include that the first feature and the second feature are in direct contact, and may also include that the first feature and the second feature are not in direct contact but are in contact through another feature between them. Moreover, the first feature being "on", "above" and "over" the second feature includes the first feature being directly above and obliquely above the second feature, or simply indicates that the first feature is at a higher level than the second feature. The first feature being "under", "below" and "beneath" the second feature includes the first feature being directly below and obliquely below the second feature, or simply indicates that the first feature is at a lower level than the second feature.

An embodiment of the present application provides an assembled structure of a pole and a pole current collector disk. The assembled structure includes a positive pole, a positive current collector disk, a first insulating member and a second insulating member. One end, being connected facing the positive current collector disk, of two ends of the positive pole is referred to as a "connection end", the other end of the positive pole is referred to as a "conductive end", and the conductive end is used as a positive connection terminal. The conductive end and the connection end are connected by a connection rod. A width of the conductive end and a width of the connection end are both larger than a width of the connection rod. The connection rod sequentially penetrates through the first insulating member and the second insulating member, the first insulating member is closer to the conductive end than the second insulating member, and an accommodating space is formed between the first insulating member and the second insulating member.

In an embodiment, the first insulating member is provided with a first through hole, the second insulating member is provided with a second through hole, a central axis of the first through hole coincides with a central axis of the second through hole, and the connection rod penetrates through the first through hole and the second through hole, a hole diameter of the first through hole and a hole diameter of the second through hole are both not less than the width of the connection rod, the width of the conductive end is larger than the hole diameter of the first through hole, and the width of the connection end is larger than the hole diameter of the second through hole.

In an embodiment, an end surface of the first insulating member facing away the second insulating member is provided with a second groove, a groove bottom surface of the second groove is provided with an orifice of the first through hole, and the conductive end is in contact with the second groove, and a width of the second groove is not less than the width of the conductive end; and an end surface of the second insulating member facing away the first insulating member is provided with a third groove, a groove bottom surface of the third groove is provided with an orifice of the second through hole, the connection end is in contact with the third groove, and a width of the third groove is not less than the width of the connection end.

In an embodiment, a sidewall of the conductive end is attached to an inner sidewall of the second groove, and an end surface, located within the second groove, of the conductive end is attached to a groove bottom surface of the second groove; a sidewall of the connection end is attached to an inner sidewall of the third groove, and an end surface, located within the third groove, of the connection end is attached to a groove bottom surface of the third groove.

In an embodiment, a height of the conductive end is not less than a depth of the second groove, so that the conductive end is conveniently electrically connected to other conductive materials.

In an embodiment, the positive current collector disk includes a welding disk and a conductive protrusion. The second insulating member is disposed between the positive current collector disk and the first insulating member, and the conductive protrusion is disposed on an end surface facing the second insulating member of the welding disk. An end surface of the connection end facing the positive current collector disk is provided with a first groove, and a width of the conductive protrusion is less than a width of the first groove. The conductive protrusion is connected to a groove bottom surface of the first groove. An end surface of the welding disk facing away the second insulating member is connected to a positive plate of a cell, and in a full-tab lithium ion battery, the end surface of the welding disk facing away the second insulating member may be disposed to be in end surface welding with the positive plate of the cell. The positive pole is electrically connected to the positive plate of the cell through the positive current collector disk.

In an embodiment, a projection of the welding disk on the end surface of the second insulating member facing away the first insulating member does not exceed a range of the end surface.

In an embodiment, the conductive protrusion of the positive current collector disk is provided with a fuse. When an inner portion of the cell connected to the welding disk is short-circuited, a large current is instantly generated on the conductive protrusion, a position where the fuse is disposed on the conductive protrusion is partially melted, and at this time, the positive pole is disconnected with the welding disk, whereby the safety protection is provided. Therefore, a contact portion of the positive current collector disk and the positive pole is only an end surface of the conductive protrusion facing away the welding disk and the groove bottom surface of the first groove, the conductive end and the welding disk are subjected to an insulation treatment, and an outer sidewall of the conductive protrusion is not in contact with an inner sidewall of the first groove. A structure with the fuse being disposed on the conductive protrusion may adopt the fuse design applied to a battery current collector disclosed in the related art.

In an embodiment, a depth of the first groove matches a height of the conductive protrusion.

In an embodiment, the width of the first groove is less than the width of the connection rod, and the groove bottom surface of the first groove is disposed inside the connection rod.

In an embodiment, when a height of the connection end is less than a depth of the third groove, the welding disk is in contact with the end surface of the second insulating member facing away the first insulating member, and a gap exists between the connection end and the welding disk.

In an embodiment, when a height of the connection end is not less than a depth of the third groove, in order to prevent a contact between the welding disk and the connection end, and at this time, an insulating layer is coated on a contact portion between the welding disk and the connection end, or an insulating layer is coated on a contact portion between the connection end and the welding disk.

In an embodiment, an edge of an end surface that the second insulating member being in contact with the welding disk is provided with a protruding stop block, and the stop block is circumferentially disposed around the welding disk. The stop block may play a role in fixing the welding disk and may also play a role in isolating and insulating a sidewall of the welding disk.

An embodiment of the present application further provides a battery, the battery includes a housing and a cell, the cell is disposed inside the housing, and the battery is provided with the assembled structure of the pole and the pole current collector disk described above. The housing is of a groove body structure, an end surface, facing away a groove opening of the housing, of the housing is referred to as a "housing bottom end surface", and a portion, between the housing bottom end surface and the groove bottom surface of the housing, of the housing is referred to as a "housing bottom portion".

In an embodiment, the cell is of a full-tab structure, the cell with the full-tab structure is sequentially subjected to an ultrasonic flattening and a mechanical flattening, then the welding disk of the positive current collector disk is welded to a positive pole end surface of the flattened cell through a laser welding, and at this time, the positive current collector disk is electrically connected to the positive plate of the cell. A connection hole is formed on the housing bottom portion and penetrates through the housing bottom portion, the positive pole penetrates through the connection hole into the housing, the second insulating member and the positive current collector disk are disposed inside the housing, and the first insulating member is disposed outside the housing bottom end surface.

In an embodiment, the housing bottom portion is partially disposed in the accommodating space, the first insulating member is in contact with the housing bottom end surface, the second insulating member is in contact with the groove bottom surface of the housing, the first insulating member and the second insulating member clamp the housing bottom portion, and the width of the first insulating member and the width of the second insulating member are both larger than a hole diameter of the connection hole, the width of the connection rod is less than the hole diameter of the connection hole, and an outer sidewall of the connection rod is not in contact with an inner sidewall of the connection hole.

In an embodiment, the width of the second insulating member is greater than the width of the first insulator. The housing of the battery is negatively charged, so that the housing bottom end surface is negatively charged, the positive pole is positively charged, the width of the first insulating member is less than a width of the housing bottom end surface, a portion, not covered by the first insulating member, of the housing bottom end surface may be used as a negative connection terminal, and at this time, the positive connection terminal and the negative connection terminal of the battery are disposed on a same end surface of the battery.

Figure 2:
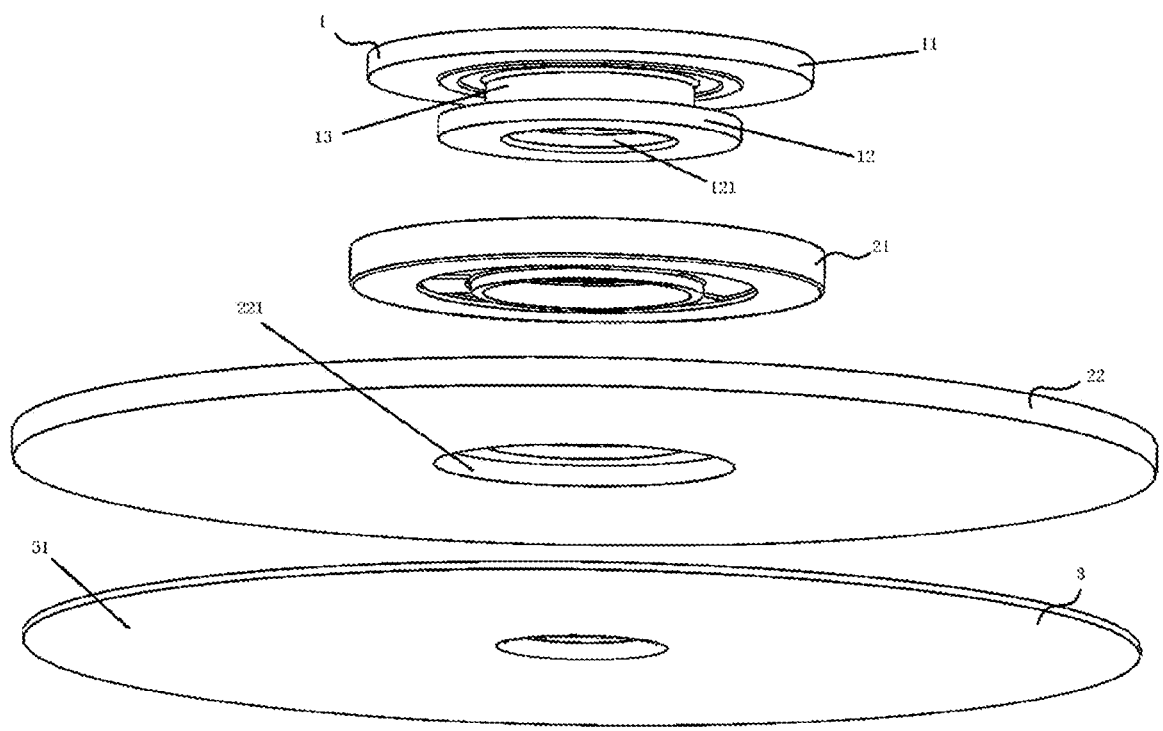
FIG. 2 is an exploded view of an assembled structure of a pole and a pole current collector disk provided in an embodiment of the present application.
Figure 3:
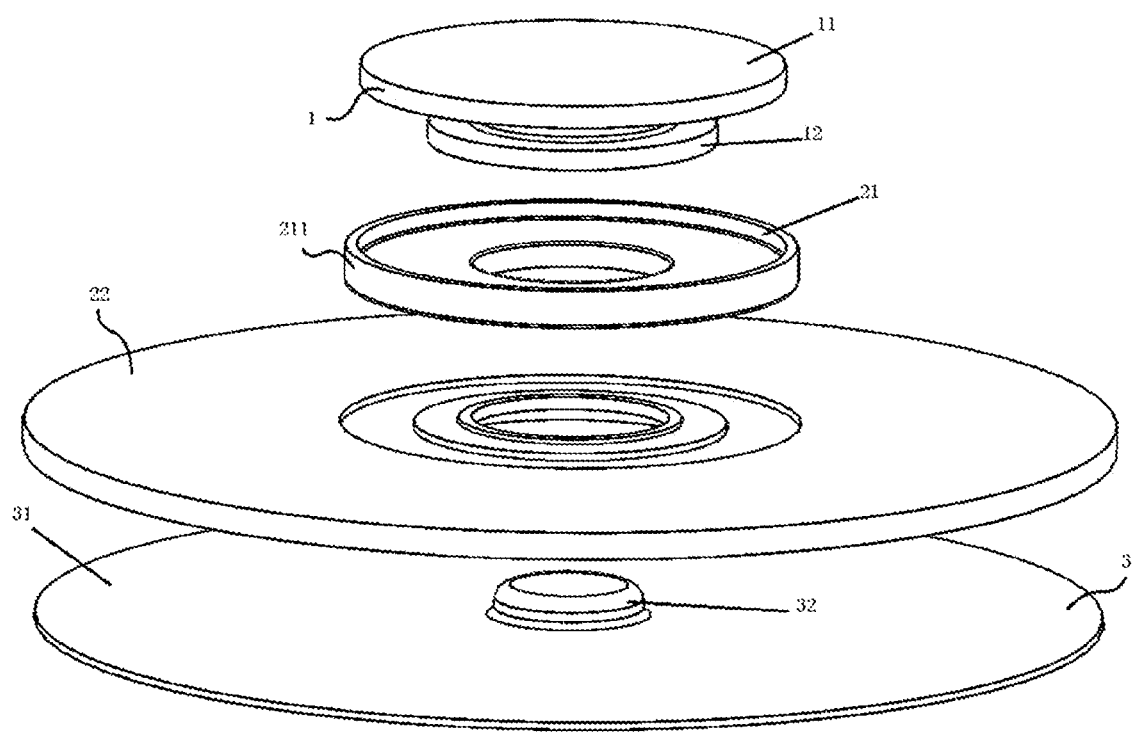
FIG. 3 is an exploded view of another assembled structure of a pole and a pole current collector disk provided in an embodiment of the present application.

As shown in FIGS. 1 to 3, an assembled structure of a positive pole 1 and a positive current collector disk 3 provided in an embodiment of the present application includes the positive pole 1, the positive current collector disk 3, a first insulating member 21 and a second insulating member 22.

The positive pole 1 includes a conductive end 11 and a connection end 12, the conductive end 11 and the connection end 12 are both of a cylindrical structure, and the conductive end 11 and the connection end 12 are connected through a cylindrical connection rod 13. A diameter of conductive end 11 is greater than a diameter of the connection end 12, and the diameter of the conductive end 11 and the diameter of the connection end 12 are both greater than a diameter of the connection rod 13. A central axis of the conductive end 11, a central axis of the connection end 12 and a central axis of the connection rod 13 coincide.

The connection rod 13 sequentially penetrates through the first insulating member 21 and the second insulating member 22. The first insulating member 21 and the second insulating member 22 are of the cylindrical structure, a diameter of second insulating member 22 is greater than a diameter of first insulating member 21, a central axis of the positive pole 1, a central axis of the first insulating member 21 and a central axis of the second insulating member 22 coincide, and an outer sidewall of the connection rod 13 is in contact with the first insulating member 21 and the second insulating member 22. The first insulating member 21 is closer to the conductive end 11 than the second insulating member 22, and an accommodating space 23 is disposed between the first insulating member 21 and the second insulating member 22.

An end surface of the first insulating member 21 facing away the second insulating member 22 is provided with a second groove 211, an end surface of the second insulating member 22 facing away the first insulating member 21 is provided with a third groove 221, a sidewall of the conductive end 11 is attached to an inner sidewall of the second groove 211, and an end surface, located inside the second groove 211, of the conductive end 11 is attached to a groove bottom surface of the second groove 211; a sidewall of the connection end 12 is attached to an inner sidewall of the third groove 221, and an end surface, located inside the third groove 221, of the connection end 12 is attached to a groove bottom surface of the third groove 221. The connection rod 13 sequentially penetrates through a groove bottom surface of the second groove 211 and a groove bottom surface of the third groove 221. A height of the conductive end 11 is greater than a depth of the second groove 211, and a height of the connection end 12 is less than a depth of the third groove 221.

The positive current collector disk 3 includes a welding disk 31 and a conductive protrusion 32, and the conductive protrusion 32 is disposed in the middle of an end surface, facing the second insulating member 22, of the welding disk 31. The welding disk 31 is of the cylindrical structure, and a diameter of the welding disk 31 is less than the diameter of the second insulating member 22. The middle of an end surface, facing the positive current collector disk 3, of the connection end 12 is provided with a first groove 121, a width of the first groove 121 is less than the diameter of the connection rod 13, a groove bottom surface of the first groove 121 is disposed inside the connection rod 13, and a width of the conductive protrusion 32 is less than the width of the first groove 121. The conductive protrusion 32 is connected to the middle of the groove bottom surface of the first groove 121, a fuse is disposed on the conductive protrusion 32 of the positive current collector disk 3, an outer sidewall of the conductive protrusion 32 is not in contact with an inner sidewall of the first groove 121, the welding disk 31 is in contact with the end surface, facing away the first insulating member 21, of the second insulating member 22, and a gap exists between the connection end 12 and the welding disk 31.

An embodiment of the present application provides the assembled structure of the pole and the pole current collector disk. The assembled structure is suitable for a full-tab lithium ion battery, such as a cylindrical full-tab lithium ion battery, a square full-tab lithium ion battery. According to the assembled structure of the pole and the pole current collector disk provided in the embodiment of the present application, the assembled structure is firm, the space in the housing of the battery may be utilized more efficiently, and the safety protection function is achieved.

Figure 4:
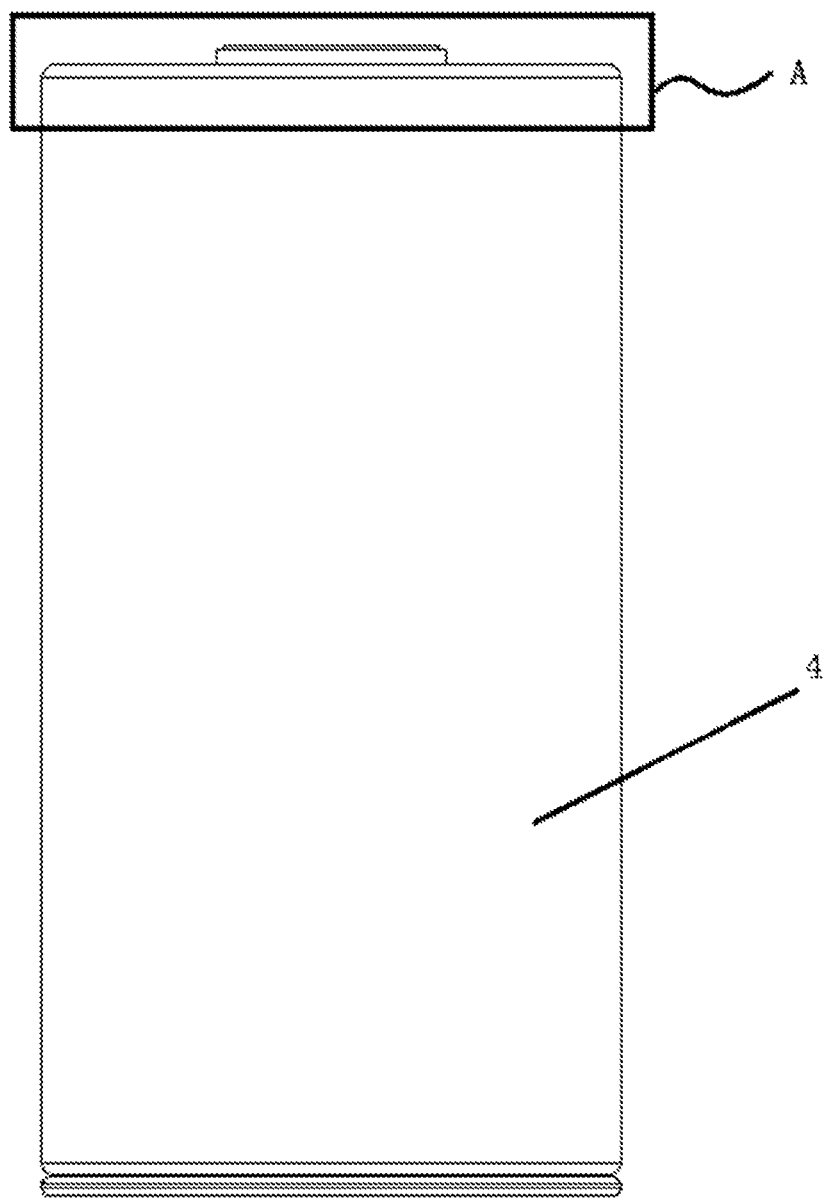
FIG. 4 is a front view of a cylindrical full-tab lithium ion battery provided in an embodiment of the present application.
Figure 5:
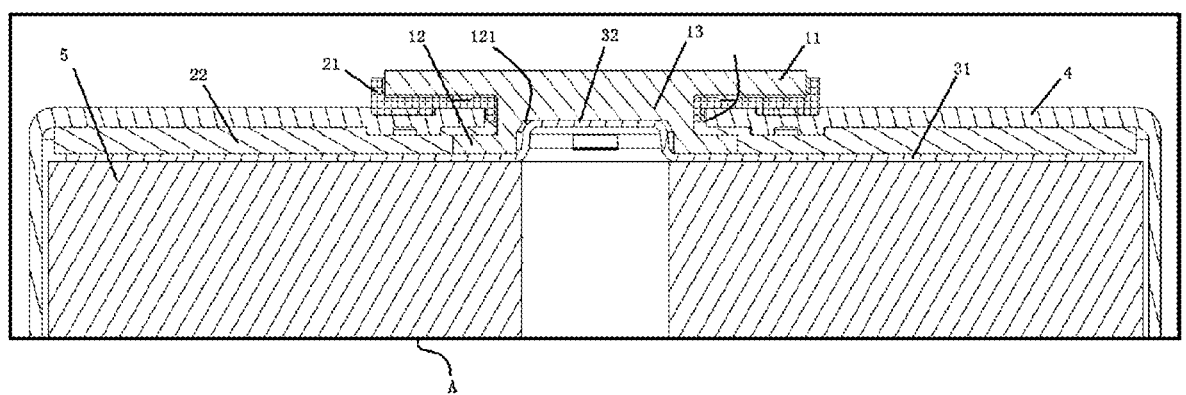
FIG. 5 is a cross-sectional view of a section A of FIG. 4.

As shown in FIGS. 4 to 5, an embodiment of the present application further provides a cylindrical full-tab lithium ion battery, the battery includes a housing 4 and a cell 5 disposed inside the housing 4, and the battery is provided with the assembled structure of the positive pole 1 and the positive current collector disk 3 provided in this embodiment. The cell 5 is of a full-tab structure, a positive pole end of the cell 5 with the full-tab structure and an end surface, facing away the conductive protrusion 32, of the welding disk 31 are subjected to a laser end surface welding, the positive current collector disk 3 is electrically connected to a positive plate of the cell 5, therefore, the positive pole 1 is electrically connected to the positive plate of the cell 5, and thus the conductive end 11 is used as a positive connection terminal. The housing 4 is of a cylindrical groove body structure and is electrically connected to a negative plate of the cell 5.

A connection hole 41 is disposed on a housing bottom portion and penetrates through the housing bottom portion, the positive pole 1 penetrates through the connection hole 41 into the housing 4, the second insulating member 22 and the positive current collector disk 3 are disposed inside the housing 4, and the first insulating member 21 is disposed outside the housing bottom end surface.

The housing bottom portion is partially disposed in the accommodating space 23, the first insulating member 21 is in contact with the housing bottom end surface, the second insulating member 22 is in contact with a groove bottom surface of the housing 4, the first insulating member 21 and the second insulating member 22 clamp the housing bottom portion, and the diameter of the first insulating member 21 and the diameter of the second insulating member 22 are both larger than a hole diameter of the connection hole 41, the diameter of the connection rod 13 is less than the hole diameter of the connection hole 41, and an outer sidewall of the connection rod 13 is not in contact with an inner sidewall of the connection hole 41. A central axis of the housing 4, a central axis of the connection hole 41 and the central axis of the positive pole 1 coincide. A portion, not covered by the first insulating member 21, of the housing bottom end surface may be used as a negative connection terminal, and the positive connection terminal and the negative connection terminal of the cylindrical full-tab lithium ion battery are disposed on a same end surface of the battery. Various technical features of the above-described embodiments may be combined arbitrarily, and in order to make the description concise, all possible combinations of the various technical features in the above-described embodiments are not described.

What is claimed is:

1. An assembled structure of a pole and a pole current collector disk, comprising a positive pole, a positive current collector disk, a first insulating member and a second insulating member, wherein the second insulating member is disposed between the positive current collector disk and the first insulating member;
    the positive pole comprises a conductive end, a connection end and a connection rod, the conductive end and the connection end are connected through the connection rod, and a width of the conductive end and a width of the connection end are both larger than a width of the connection rod;
    the connection rod sequentially penetrates through the first insulating member and the second insulating member, the first insulating member is closer to the conductive end than the second insulating member, and an accommodating space is formed between the first insulating member and the second insulating member; and
    the positive current collector disk comprises a welding disk and a conductive protrusion, the conductive protrusion is disposed on an end surface of the welding disk facing the second insulating member, and an end surface of the connection end facing the positive current collector disk is provided with a first groove, a contact portion of the positive current collector disk and the positive pole is an end surface of the conductive protrusion facing away the welding disk and a groove bottom surface of the first groove.

2. The assembled structure of claim 1, wherein the first insulating member is provided with a first through hole, the second insulating member is provided with a second through hole, a central axis of the first through hole coincides with a central axis of the second through hole, the connection rod penetrates through the first through hole and the second through hole, a hole diameter of the first through hole and a hole diameter of the second through hole are both not less than the width of the connection rod, the width of the conductive end is larger than the hole diameter of the first through hole, and the width of the connection end is larger than the hole diameter of the second through hole.

3. The assembled structure of claim 2, wherein,
    an end surface of the first insulating member facing away the second insulating member is provided with a second groove, a groove bottom surface of the second groove is provided with an orifice of the first through hole, and the conductive end is in contact with the second groove; and
    an end surface of the second insulating member facing away the first insulating member is provided with a third groove, a groove bottom surface of the third groove is provided with an orifice of the second through hole, and the connection end is in contact with the third groove.

4. The assembled structure according to claim 3, wherein a sidewall of the conductive end is attached to an inner sidewall of the second groove, and an end surface, located within the second groove, of the conductive end is attached to a groove bottom surface of the second groove; a sidewall of the connection end is attached to an inner sidewall of the third groove, and an end surface, located within the third groove, of the connection end is attached to a groove bottom surface of the third groove.

5. The assembled structure of claim 4, wherein a height of the conductive end is not less than a depth of the second groove.

6. The assembled structure of claim 5, wherein the conductive protrusion is provided with a fuse.

7. The assembled structure of claim 6, wherein a height of the connection end is less than a depth of the third groove, the welding disk is in contact with the end surface of the second insulating member facing away the first insulating member, and a gap exists between the connection end and the welding disk.

8. A battery, comprising a housing and a cell disposed inside the housing, wherein the housing is of a groove body structure, the housing comprises a housing bottom portion and a housing bottom end surface, wherein the battery is provided with an assembled structure of a pole and a pole current collector disk;
  the assembled structure of the pole and the pole current collector disk comprises a positive pole, a positive current collector disk, a first insulating member and a second insulating member, and the second insulating member is disposed between the positive current collector disk and the first insulating member;
  the positive pole comprises a conductive end, a connection end and a connection rod, the conductive end and the connection end are connected through the connection rod, and a width of the conductive end and a width of the connection end are both larger than a width of the connection rod;
  the connection rod sequentially penetrates through the first insulating member and the second insulating member, the first insulating member is closer to the conductive end than the second insulating member, and an accommodating space is formed between the first insulating member and the second insulating member;
  the positive current collector disk comprises a welding disk and a conductive protrusion, the conductive protrusion is disposed on an end surface of the welding disk facing the second insulating member, and an end surface of the connection end facing the positive current collector disk is provided with a first groove, a contact portion of the positive current collector disk and the positive pole is only an end surface of the conductive protrusion facing away the welding disk and a groove bottom surface of the first groove.

9. The battery of claim 8, wherein the first insulating member is provided with a first through hole, the second insulating member is provided with a second through hole, a central axis of the first through hole coincides with a central axis of the second through hole, the connection rod penetrates through the first through hole and the second through hole, a hole diameter of the first through hole and a hole diameter of the second through hole are both not less than the width of the connection rod, the width of the conductive end is larger than the hole diameter of the first through hole, and the width of the connection end is larger than the hole diameter of the second through hole.

10. The battery of claim 9, wherein,
  an end surface of the first insulating member facing away the second insulating member is provided with a second groove, a groove bottom surface of the second groove is provided with an orifice of the first through hole, and the conductive end is in contact with the second groove; and
  an end surface of the second insulating member facing away the first insulating member is provided with a third groove, a groove bottom surface of the third groove is provided with an orifice of the second through hole, and the connection end is in contact with the third groove.

11. The battery of claim 10, wherein a sidewall of the conductive end is attached to an inner sidewall of the second groove, and an end surface, located within the second groove, of the conductive end is attached to a groove bottom surface of the second groove; a sidewall of the connection end is attached to an inner sidewall of the third groove, and an end surface, located within the third groove, of the connection end is attached to a groove bottom surface of the third groove.

12. The battery of claim 11, wherein a height of the conductive end is not less than a depth of the second groove.

13. The battery of claim 12, wherein the conductive protrusion is provided with a fuse.

14. The battery of claim 13, wherein a height of the connection end is less than a depth of the third groove, the welding disk is in contact with the end surface of the second insulating member facing away the first insulating member, and a gap exists between the connection end and the welding disk.

15. The battery of claim 8, wherein the housing bottom portion is provided with a connection hole, the connection hole penetrates through the housing bottom portion, and the positive pole in the assembled structure penetrates through the connection hole into the housing, the second insulating member in the assembled structure and the positive current collector disk in the assembled structure are disposed inside the housing, the first insulating member in the assembled structure is disposed outside the housing bottom end surface, the first insulating member is in contact with the housing bottom end surface, the second insulating member is in contact with a groove bottom surface of the housing, the width of the connection rod of the positive pole is less than a hole diameter of the connection hole, and an outer sidewall of the connection rod is not in contact with an inner sidewall of the connection hole.

16. The battery of claim 15, wherein the cell is of a full-tab structure, and an end surface of, facing away the conductive protrusion of the positive current collector disk, of the welding disk of the positive current collector disk is connected to a positive pole end surface of the cell.

17. The battery of claim 9, wherein the housing bottom portion is provided with a connection hole, the connection hole penetrates through the housing bottom portion, and the positive pole in the assembled structure penetrates through the connection hole into the housing, the second insulating member in the assembled structure and the positive current collector disk in the assembled structure are disposed inside the housing, the first insulating member in the assembled structure is disposed outside the housing bottom end surface, the first insulating member is in contact with the housing bottom end surface, the second insulating member is in contact with a groove bottom surface of the housing, the width of the connection rod of the positive pole is less than a hole diameter of the connection hole, and an outer sidewall of the connection rod is not in contact with an inner sidewall of the connection hole.

18. The battery of claim 17, wherein the cell is of a full-tab structure, and an end surface of, facing away the conductive protrusion of the positive current collector disk, of the welding disk of the positive current collector disk is connected to a positive pole end surface of the cell.

19. The battery of claim 10, wherein the housing bottom portion is provided with a connection hole, the connection hole penetrates through the housing bottom portion, and the positive pole in the assembled structure penetrates through the connection hole into the housing, the second insulating member in the assembled structure and the positive current collector disk in the assembled structure are disposed inside the housing, the first insulating member in the assembled structure is disposed outside the housing bottom end surface, the first insulating member is in contact with the housing bottom end surface, the second insulating member is in contact with a groove bottom surface of the housing, the width of the connection rod of the positive pole is less than a hole diameter of the connection hole, and an outer sidewall of the connection rod is not in contact with an inner sidewall of the connection hole.

20. The battery of claim 19, wherein the cell is of a full-tab structure, and an end surface of, facing away the conductive protrusion of the positive current collector disk, of the welding disk of the positive current collector disk is connected to a positive pole end surface of the cell.

* * * * *